(12) United States Patent
Thompson et al.

(10) Patent No.: US 6,705,458 B2
(45) Date of Patent: Mar. 16, 2004

(54) GATE FOR A VIBRATORY CONVEYOR

(75) Inventors: Brian K. Thompson, Tigard, OR (US);
David G. Gibson, Newberg, OR (US)

(73) Assignee: FMC Technologies, Inc., Chicago, IL (US)

( * ) Notice: Subject to any disclaimer, the term of this patent is extended or adjusted under 35 U.S.C. 154(b) by 130 days.

(21) Appl. No.: 10/043,666

(22) Filed: Jan. 10, 2002

(65) Prior Publication Data

US 2002/0088694 A1 Jul. 11, 2002

Related U.S. Application Data

(60) Provisional application No. 60/261,128, filed on Jan. 11, 2001.

(51) Int. Cl.[7] .......................... B65G 27/00; B65G 19/18; B65G 19/28; B65G 47/10; B65G 47/46
(52) U.S. Cl. .............................. 198/752.1; 198/369.7; 198/735.1
(58) Field of Search ........................... 198/347.1, 369.7, 198/735.1, 752.1, 758, 860.4

(56) References Cited

U.S. PATENT DOCUMENTS 2,776,741 A * 1/1957 Carrier, Jr. .................. 198/359
3,042,360 A * 7/1962 Sneddon ...................... 198/763
3,972,415 A * 8/1976 Rohde ....................... 198/860.4
6,047,811 A * 4/2000 Zittel et al. ............... 198/752.1
6,119,849 A * 9/2000 Svejkovsky et al. ..... 198/860.4
6,193,050 B1 * 2/2001 Svejkovsky et al. ..... 198/752.1

* cited by examiner

*Primary Examiner*—Gene O. Crawford
(74) *Attorney, Agent, or Firm*—Christensen O'Connor Johnson Kindness PLLC

(57) ABSTRACT

A gate (50) for a vibratory conveyor (10) is provided. The conveyor includes a conveyor bed (26) that has a surface portion defining an aperture (52). The gate includes a cover plate (54) which is in contact with the conveyor bed and arranged for movement between a first position covering a first portion of the aperture and a second position covering a second portion of the aperture (e.g., between an open position and a closed position). The gate further includes a loading system (57, 72) coupled to the cover plate to exert a force urging the cover plate into contact with the surface portion of the conveyor bed. The gate still further includes a carriage assembly (55) coupled to the loading system for moving the cover plate between the first and second positions. Material conveyed on the conveyor bed can fall through the uncovered portion of the aperture to be thereby diverted from the conveyor bed.

21 Claims, 6 Drawing Sheets

GATE FOR A VIBRATORY CONVEYOR

CROSS-REFERENCE TO RELATED APPLICATION

This application claims the benefit under 35 U.S.C. §119 (e) of U.S. Provisional Application No. 60/261,128, filed Jan. 11, 2001.

FIELD OF THE INVENTION

The present invention relates to vibratory conveyors and, more particularly, to a gate for diverting conveyed material from a vibratory conveyor.

BACKGROUND OF THE INVENTION

An excited frame vibratory conveying system is disclosed by Gilman in U.S. Pat. Nos. 6,079,550 and 6,253,908, which are incorporated by reference herein. A vibratory conveying system consists of a conveying member that is spring mounted on a frame. A vibratory actuator on the frame causes the conveying member to vibrate in a substantially longitudinal direction along the conveying member at its natural frequency. The conveying member is trough-shaped, and material to be conveyed is introduced at one end of the conveying member and moves to the other end as the result of the vibration of the conveying member. Excited frame vibratory conveying systems are particularly suited for conveying particulate bulk material such as powdered, granulated, or comminuted material; small parts such as nuts, bolts, or washers; and other solids comprising relatively small pieces such as various food products.

The utility of a conveying system is greatly enhanced if some or all of the conveyed material can be selectively diverted from the conveyor at a point or points intermediate to the ends of the conveyor. This permits selective diversion of the material to other conveyors, containers, or processes. One method of diverting material from the elongated conveying member of a vibratory conveying system is to provide a gate in the bottom or bed of the conveying member. Generally, the gate comprises an aperture in the bed of the conveying member that is selectively covered by a cover plate. Typically, the cover plate is arranged to slide in a pair of channels defined by guides affixed to the underside of the bed of the conveying member. An actuator attached to the cover plate is arranged to slide the cover plate in the channels to selectively expose more or less of the aperture, controlling the amount of the conveyed material falling vertically through the aperture in the bed of the conveying member. This gate arrangement has several disadvantages, particularly when used with a vibratory conveyor.

First, it is desirable to minimize the mass of the conveying member to reduce the magnitude of the vibratory forces necessary to operate the conveyor. Therefore, the conveying member is characteristically constructed of relatively light-gauge material. However, affixing the guide channels, cover plate, and cover plate actuator to the conveying member increases its mass. Additional mass may also be required to stiffen the conveying member sufficiently to withstand the forces generated by the cover plate actuator. To reduce the mass of the conveying member, the cover plate actuator may be anchored instead to the excited frame or other stationary structure. However, such configuration requires a sophisticated isolation mechanism to ensure that the actuation force to be exerted on the cover plate will not interfere with the vibratory motion of the conveying member caused by the excited frame. Such a mechanism is complex and expensive.

Second, the channels in the guides for slidably supporting the cover plate must have sufficient clearance to permit the cover plate to slide easily therein. Consequently, when the conveying member is vibrating, the cover plate may move in the channels, producing noise and also causing the channels and the cover plate to wear in the areas of contact. The loose fit of the cover plate in the channels, which is exacerbated by wear, permits dust and other fines in the conveyed material to infiltrate into the interface between the channels and the cover plate. The buildup of material in the channels may make the gate difficult to operate in some cases and, in the case of handling food products, may pose sanitary problems. Further, if the cover plate loosens sufficiently in the guide channels, it can move independently of the cover plate actuator merely in response to the vibratory excitation of the conveying member. Uncontrolled motion of the cover plate interferes with the movement of the conveyed material and can substantially degrade the performance of the conveyor. For these reasons, gates of this construction require substantial maintenance, including frequent adjustment of the cover plate relative to the guide channels and removal of the cover plate to permit cleaning of the guide channels. Such gate maintenance is costly and requires that the operation of the conveyor and related processes be suspended for a significant period.

What is desired, therefore, is a gate for a vibratory conveyor that is compatible with the operation and structure of the vibratory conveyor, minimizes wear, is impervious to the effects of infiltration of dust and fines, and requires minimal maintenance.

SUMMARY OF THE INVENTION

The present invention provides a gate for a conveyor, for example a vibratory conveyor, that achieves all of the desired characteristics described above. The conveyor for incorporating a gate of the present invention includes a conveyor bed that has a surface portion defining an aperture. The gate includes a cover plate in contact with the conveyor bed but not otherwise constrained to move with the conveyor bed. The cover plate is arranged for movement between a first position covering a first portion of the aperture and a second position covering a second portion of the aperture (e.g., between an open position and a closed position). The gate further includes a loading system (e.g., a combination of elastic elements) coupled to the cover plate and exerting a force urging the cover plate into contact with the surface portion of the conveyor bed defining the aperture. The gate still further includes a carriage assembly coupled to the loading system for moving the cover plate between the first and second positions.

In one aspect of the present invention, the gate is particularly suited for use with a vibratory conveyor. A vibratory conveyor includes a conveyor bed and an excited frame that vibrates the conveyor bed. The carriage assembly of the gate of the present invention includes a base element coupled to the excited frame of the vibratory conveyor and a movable element coupled to the loading system. More specifically, the base element may be formed of a mounting block having a portion defining a bore, and the movable element may be formed of a support rod slidably arranged in the bore to be moveable in a direction substantially parallel to the surface portion of the conveyor bed defining the aperture.

In another aspect of the present invention, the carriage assembly generally prohibits movement of the cover plate in a direction normal to the surface portion of the conveyor defining the aperture bed but permits movement of the cover plate in a direction parallel to the surface portion. To this end, the movable element of the carriage assembly may further include a linear actuator to cause linear movement of the movable element in a direction parallel to the surface portion, such as a pneumatic actuator, an electric actuator, and a hydraulic actuator.

In yet another aspect of the present invention, the loading system may be formed of a plurality of elastic elements, for example a spring plate and an elastomer mount, which are arranged in series to exert a force to maintain the contact between the cover plate and the conveyor bed.

As will be apparent from the foregoing, the gate of the present invention provides several advantages. Because the cover plate is not connected to the conveyor bed of a conveying member, the mass of the conveying member is not altered (increased) by the provision of the gate or any reinforcement required to withstand the forces produced by actuation of the gate. Likewise, because the cover plate and its actuator are not connected to the conveying member, a complex mechanism is not required to isolate the mechanism for actuating the cover plate from the vibratory motion of the conveying member. Furthermore, since no sliding channels are required to support a cover plate, the source of significant wear and noise is eliminated. Still further, because the gate of the present invention is not constrained to the conveying member, any dust or fines that may infiltrate into the interface between the cover plate and the conveying member will migrate out of the interface during relative movement of the cover plate and the conveying member, and thus the gate is self-cleaning. Accordingly, with the gate of the present invention, deterioration of conveyor performance, noise, need for frequent maintenance, and conveyor downtime are substantially reduced.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION OF THE PREFERRED EMBODIMENTS

Figure 1:
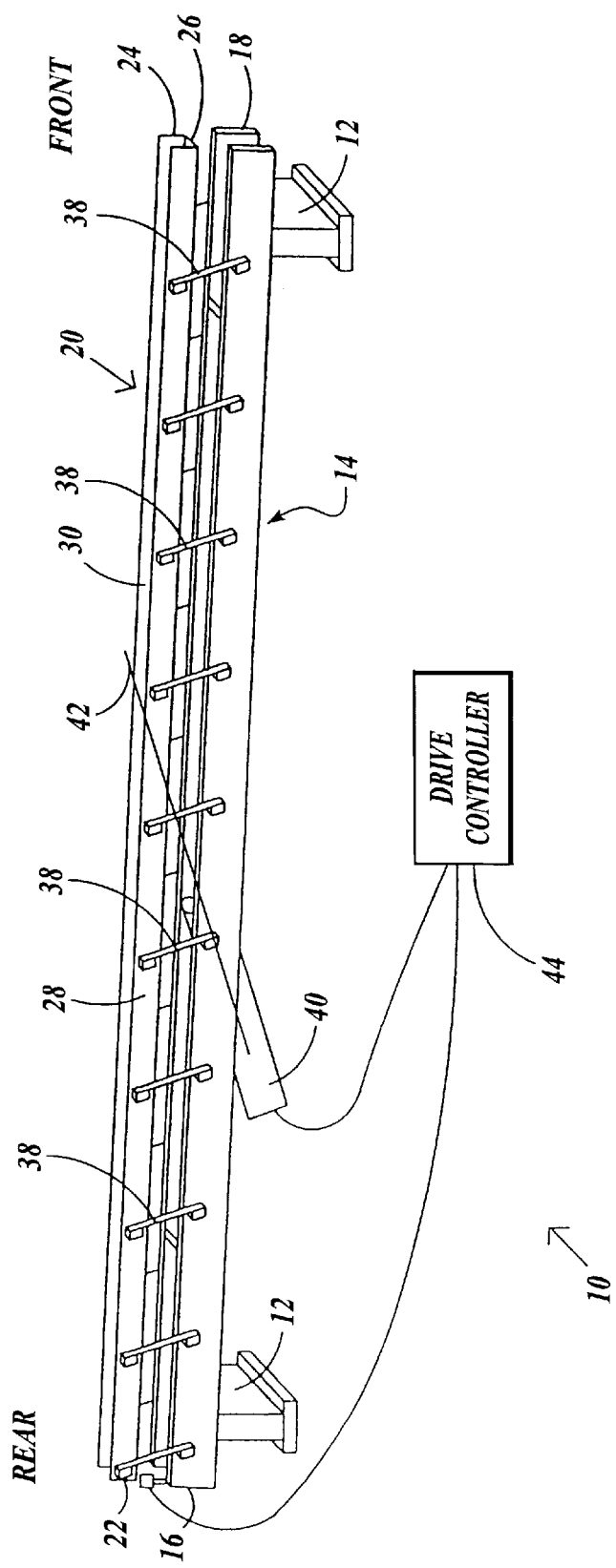
FIG. 1 is a pictorial representation of an excited frame vibratory conveyor system.
Figure 2:
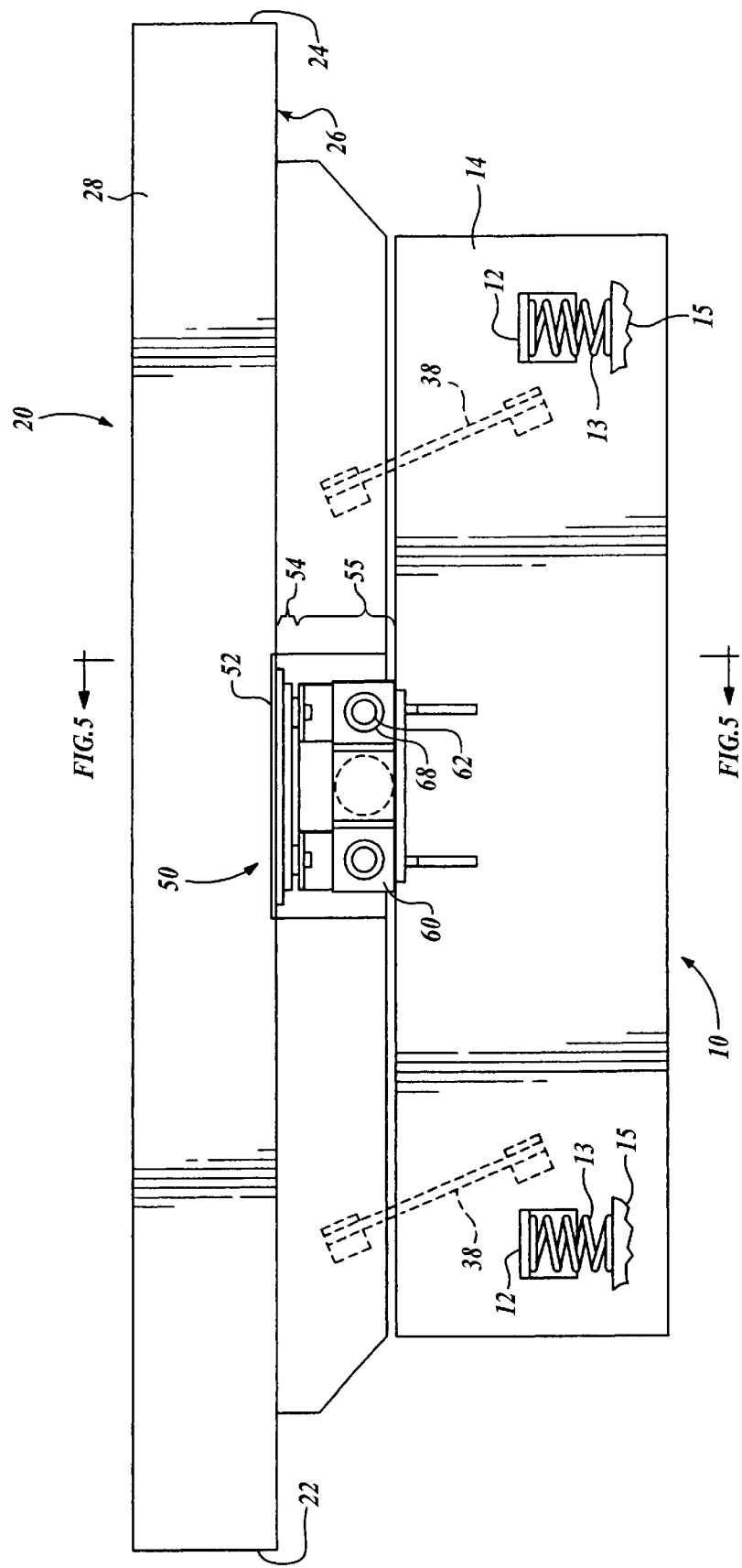
FIG. 2 is a side elevational view of an excited frame vibratory conveyor incorporating a gate of the present invention.

FIG. 1 illustrates an excited frame vibratory conveying system 10, suitable for incorporating a gate of the present invention. The conveying system 10 is supported by a pair of stationary supports 12. The stationary supports 12 include pillars that are attached at one end to the floor and at the other end to the conveying system 10. Alternatively, the conveying system 10 may be mounted to (or suspended from) an upper support, such as a ceiling. Referring additionally to FIG. 2, the stationary supports 12 typically include elastic isolation elements, such as springs 13, to isolate the structure 15 to which the conveying system 10 is attached (e.g., the floor) from vibration transmitted through the stationary supports 12.

Referring back to FIG. 1, the conveying system 10 includes an elongate excited frame 14 including a rear end 16 and a front end 18. In the present description, the terms "rear" and "front" or "rearward" and "forward" are used with respect to the intended direction of movement of material to be conveyed on the conveying system 10.

The conveying system 10 also includes an elongate conveying member 20 that extends between a rear end 22 and a front end 24. The conveying member 20 includes a conveyor bed 26 for receiving the conveyed material (e.g., particulate matter). The conveying member 20 further includes a pair of side walls 28 and 30 that extend between the front and rear ends 24, 22 of the conveying member 20. The conveying member 20 is preferably a lightweight, generally rigid structure.

The conveying system 10 further includes a support structure that resiliently supports the conveying member 20 on the excited frame 14. The support structure includes leaf or beam springs 38 that interconnect the conveyor member 20 and the excited frame 14. The springs 38 are spaced apart longitudinally along both sides of the conveying member 20 to enable the conveying member 20 to undergo vibrational motion in a generally forward and rearward reciprocating motion with respect to the excited frame 14.

Each of the springs 38 are attached, with bolts or other suitable fasteners, at a slight inclined angle with respect to the longitudinal direction of the conveying system 10. The springs 38 may be mounted on the outside of the conveyor as illustrated in FIG. 1 or on the inside of the side walls of the conveying member 20 and excited frame 14 as illustrated in FIG. 2. The springs 38 prevent transverse movement of the conveying member 20 with respect to the excited frame 14. The actual path of the reciprocating movement between the conveying member 20 and the excited frame 14 is in the nature of parallelogram, but for small displacements or vibrations, the path may be approximated as a straight line that is generally perpendicular to the direction of the springs 38 in their undeflected position. The size and number of the springs 38 may be varied to adjust the spring constants.

Still referring to FIG. 1, the conveying system 10 finally includes a vibratory drive 40, which is directly connected to the excited frame 14 to vibrate the excited frame 14 in the intended direction of conveying. The vibratory drive 40 is preferably an electromagnetic drive that produces a vibratory motion along a linear force axis, but may be a rotating mass or other drive capable of generating vibratory force. The drive 40 exerts its force to the excited frame 14 along a linear force axis 42, which is generally perpendicular to the set of springs 38. Additionally, the force axis 42 extends through a center of mass of the conveying system 10. The vibratory drive 40 is controlled by a drive controller 44.

Figure 3:
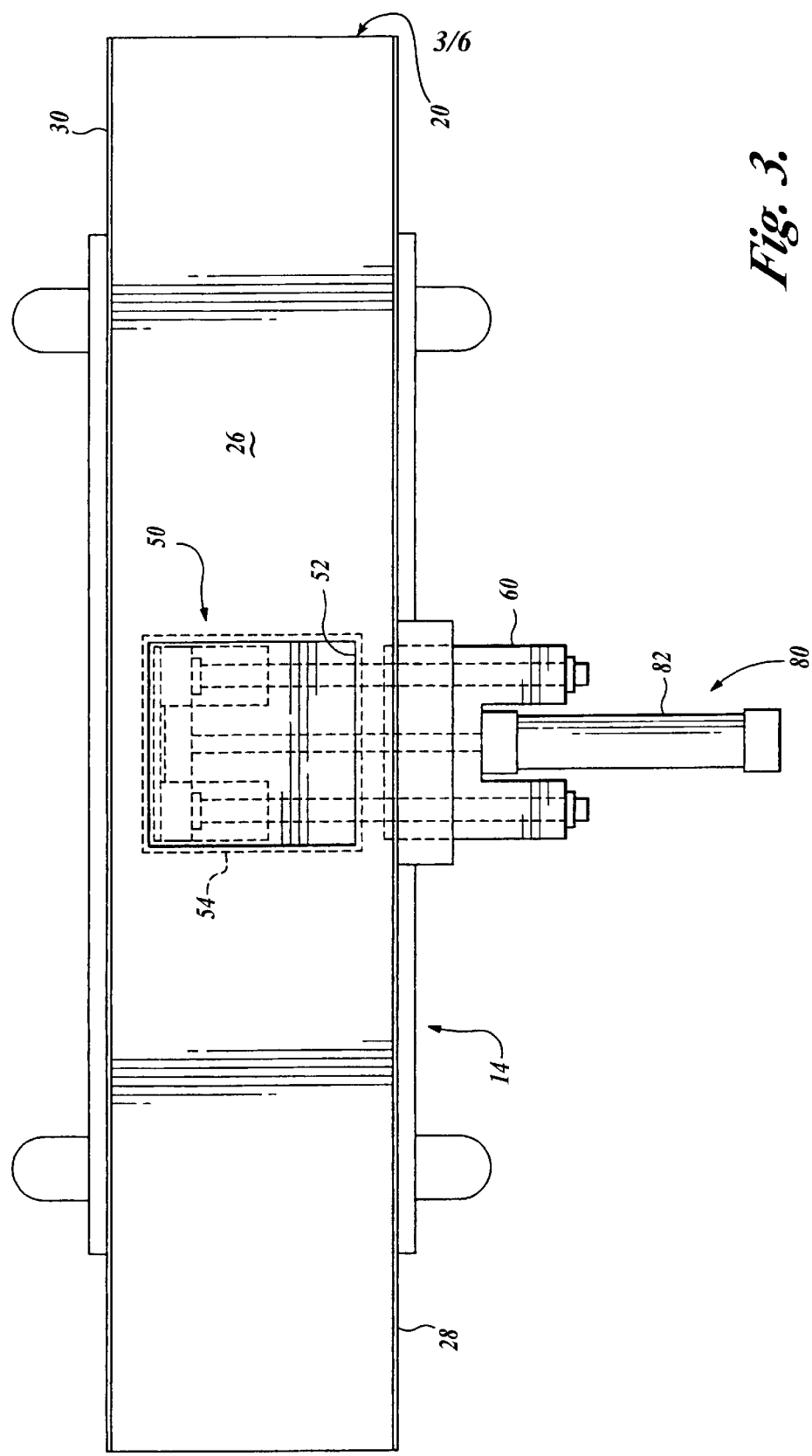
FIG. 3 is a plan (top) view of the vibratory conveyor incorporating the gate of FIG. 2.

Referring additionally to FIG. 2, the vibratory conveying system 10 described above is suited for incorporating one or more gates 50 of the present invention, to facilitate diversion of the conveyed material from the conveyor bed 26 at points intermediate to the rear and front ends 22, 24 of the conveying member 20. While FIG. 2 depicts the conveying system 10 that is substantially shorter in longitudinal length than that illustrated in FIG. 1 for ease of illustration, the construction and operation of the conveying system 10 in FIG. 2 are substantially the same as described above. Referring further additionally to FIG. 3, the gate 50 is used with a portion of the conveyor bed 26 defining an aperture 52. The gate 50 includes generally two elements: a cover plate 54 in contact with a surface of the conveyor bed 26 and arranged for movement relative to the surface to selectively expose the aperture 52; and a carriage assembly 55 coupled to the cover plate 54 to move the cover plate 54.

Figure 4:
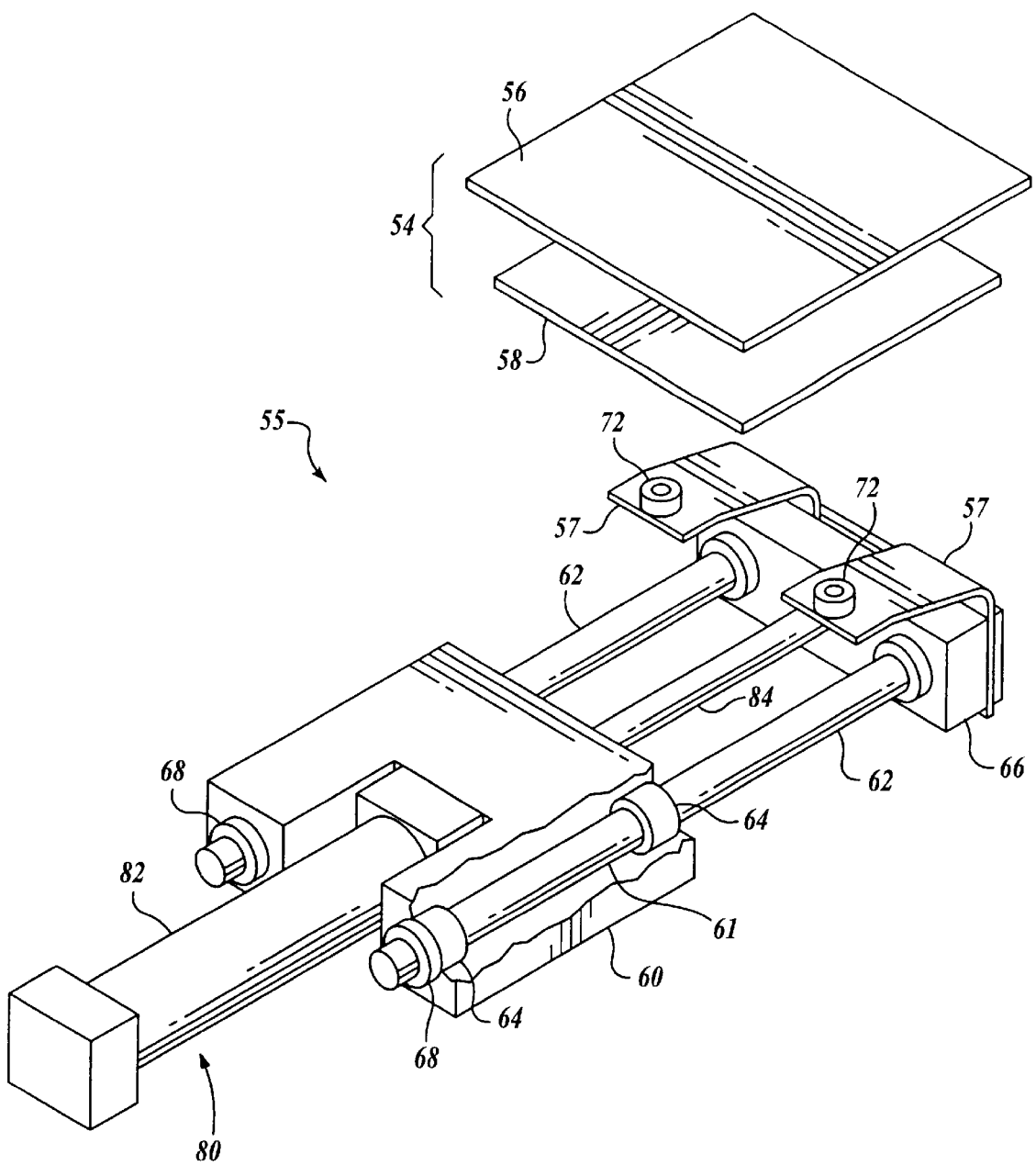
FIG. 4 is an exploded view of the gate of FIGS. 2 and 3, including a cover plate and a carriage assembly.
Figure 5:
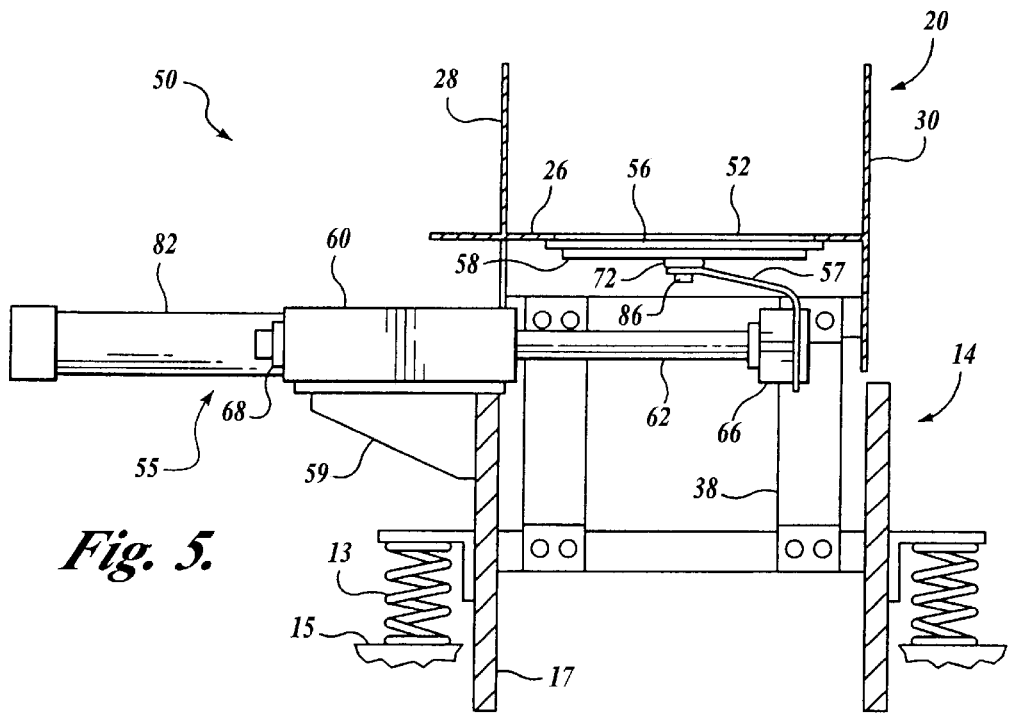
FIG. 5 is a partial cross-sectional view of the vibratory conveyor incorporating the gate of FIG. 2 taken along line 5—5, illustrating the gate in a closed position.

Referring further additionally to FIGS. 4 and 5, the construction of the gate 50 is described in detail. As illustrated, the aperture 52 defined through the conveyor bed 26 is typically rectangular, but apertures of other shapes may be used.

As described in the background section above, heretofore, gates for conveying systems have been slidably mounted to the conveying member using guide channels, which are subject to substantial wear, noise, and dust accumulation and require frequent maintenance. The inventors of the present invention realized that attachment of the cover plate to the conveying member was a significant cause of the maintenance and performance problems with these gates. The inventors further realized that constraining the cover plate to the light-weight vibrating conveying member undesirably increased the overall mass of the conveying member and also undesirably created a need to isolate the mechanism for actuating the cover plate from the vibratory motion of the conveying member relative to the excited frame.

Accordingly, in the gate 50 of the present invention, the aperture 52 in the conveyor bed 26 is sealed by contact between the cover plate 54 and a surface of the conveyor bed 26 when the gate is closed, but the cover plate 54 is not attached to the conveying member 20 or otherwise restrained thereto. The cover plate 54 includes a bearing plate 56 and a support plate 58, and is held in contact with the bottom surface of the conveyor bed 26 preferably by a spring force exerted by a spring plate 57 attached to the carriage assembly 55. The carriage assembly 55 is mounted to the excited frame 14 by a support block 59, which is typically affixed to a side plate 17 of the excited frame 14 with bolts. Referring specifically to FIG. 4, the carriage assembly 55 includes a mounting block 60, which defines a pair of bores 61 through which a pair of support rods 62 are slidably mounted via bushings 64. Each of the support rods 62 includes a stop collar 68 at one end to prevent disengagement of the support rod 62 from the mounting block 60 when the support rod 62 is extended as shown in FIG. 4. The other ends of the support rods 62 are attached to and support a carriage block 66.

The cover plate 54 is held against the bottom surface of the conveyor bed 26 preferably by a spring force. The spring force is generated by the spring plate 57, which is bolted to the carriage block 66 and includes an elastomer mount 72. The elastomer mounts 72 intervene between the spring plates 57 and the cover plate 54 (or more specifically the support plate 58). The amount of spring force applied to the cover plate 54 can be adjusted by various means, such as by varying the distance between the carriage assembly 55 and the surface of the conveyor bed 26 against which the cover plate 54 is held, by compressing the elastomer mounts 72, or by bending the cantilevered elements of the spring plate 57. Typically, a modest spring force is required to support the cover plate 54 and a quantity of conveyed material on the upper surface of the cover plate 54.

The spring plate 57 and the elastomer mount 72 together form a loading (or biasing) system for elastically supporting the cover plate 54. Specifically, contact between the cover plate 54 and the conveyor bed 26 surface is maintained during the limited vertical displacements of the vibrating excited frame 14 by the elastic compliance of the elastomer mounts 72 and the spring plates 57. Generally, the cover plate 54 vibrates transversely with the conveyor bed 26 as a result of friction therebetween although the cover plate 54 is not constrained to move with the conveyor bed 26. The elastic mounts 72 and the spring plates 57 serve to isolate the carriage assembly 55 from vibration of the cover plate 54 with the conveyor bed 26. At the same time, the series arrangement of the elastic mount 72 and the spring plate 57 optimizes the isolation of the cover plate 54 from the vibratory movement of the excited frame 14. It should be understood by those skilled in the art that other arrangements may be used to achieve the same or similar effects achieved by the loading system including the spring plate 57 and the elastomer mount 72 of the illustrated embodiment.

While the gate 50 might be designed to be partially open at all times, the cover plate 54 is typically larger than the aperture 52 in the conveyor bed 26 (see FIG. 3) to completely seal the aperture 52 when the gate 50 is closed. Therefore, when the gate 50 is closed, only a generally annular area along the periphery of the bearing plate 56 is in contact with the conveyor bed 26 around the aperture 52. However, when the cover plate 54 is withdrawn from the aperture 52 to open the gate 50, an increasing portion of the total surface area of the bearing plate 56 comes in contact with the conveyor bed 26. Thus, even while the cover plate 54 is moved relative to the conveyor bed 26, the contact pressure at their interface is limited because of the combination of the use of modest spring force and increase in the contact area between the cover plate 54 and the conveyor bed 26. The limited contact pressure reduces wear and abrasion of any contacting surfaces between the cover plate 54 and the conveyor bed 26. The bearing plate 56 may be formed of plastic or other material suitable for minimizing abrasion from contact with the conveyor bed 26 and also for coming in contact with a particular material to be conveyed.

Figure 6:
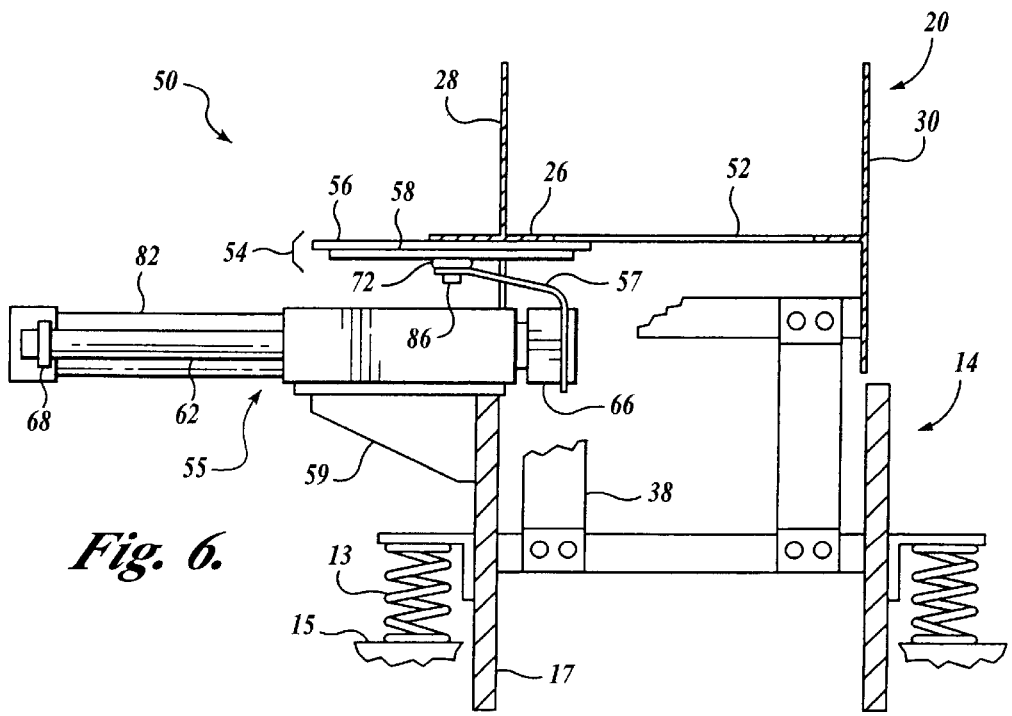
FIG. 6 is a partial cross-sectional view of the vibratory conveyor incorporating the gate of FIG. 2, illustrating the gate in an open position.

Referring specifically to FIGS. 3 and 4, the carriage assembly 55 includes an actuator 80 for moving the cover plate 54 transversely on the surface of the conveyor bed 26 for selectively altering exposure of the aperture 52. A typical actuator 80 is a double-acting linear actuator having a shell 82 attached to a surface of the mounting block 60. Pressurized fluid introduced at one end of the shell 82 causes a piston (not illustrated) within the shell 82 to be displaced toward the opposite end of the shell 82. A movable element, for example an actuator rod 84, is attached to the piston at one end and to the carriage block 66 at the other end. When the actuator rod 84 is extended or retracted, the support rods 62 are drawn through the bores 61 in the mounting block 60 by motion of the carriage block 66. Corresponding movement of the spring plates 57, extending from the carriage block 66 to support the cover plate 54 with bolts 86 (see FIG. 5), displaces the cover plate 54 to expose a lesser or greater portion of the aperture 52. FIGS. 5 and 6 illustrate the gate 50 of the present invention, wherein the actuator rod 84 is fully extended and retracted, respectively, to thereby close and open the gate 50. The gate actuator 80 is typically a pneumatic actuator for applications in which compressed air is readily available and fluid contamination is problematic. However, any appropriate actuator, including electric and hydraulic actuators, may be used.

Since both the cover plate 54 and the actuator 80 are not connected to the conveying member 20, the mass of the conveying member 20 is not altered (increased) by the provision of the gate 50 or any reinforcement required to withstand the forces produced by actuation of the gate 50. Likewise, because the cover plate 54 and the actuator 80 are not connected to the conveying member 20, a complex mechanism is not required to isolate the mechanism for actuating the cover plate 54 from the vibratory motion of the conveying member 20.

Because the gate of the present invention is not constrained to the conveying member 20, the gate 50 is self-cleaning. Infiltration of dust and fines in the interface of the cover plate 54 and conveyor bed 26 is limited because the cover plate 54 fits tightly against the conveyor bed 26 and generally moves with the conveyor bed 26. At the same time, since the gate 50 is not attached to the conveyor bed 26, there is some relative movement, and any infiltrate would migrate out of the interface during such relative movement. Dust or fines migrating to edges of the cover plate 54 is free to disperse, since the gate 50 is free of any barriers that might trap the dust or fines. Accordingly, with the gate 50 of the present invention, deterioration of conveyor performance, noise, need for frequent maintenance, and conveyor downtime are substantially reduced.

Figure 7:
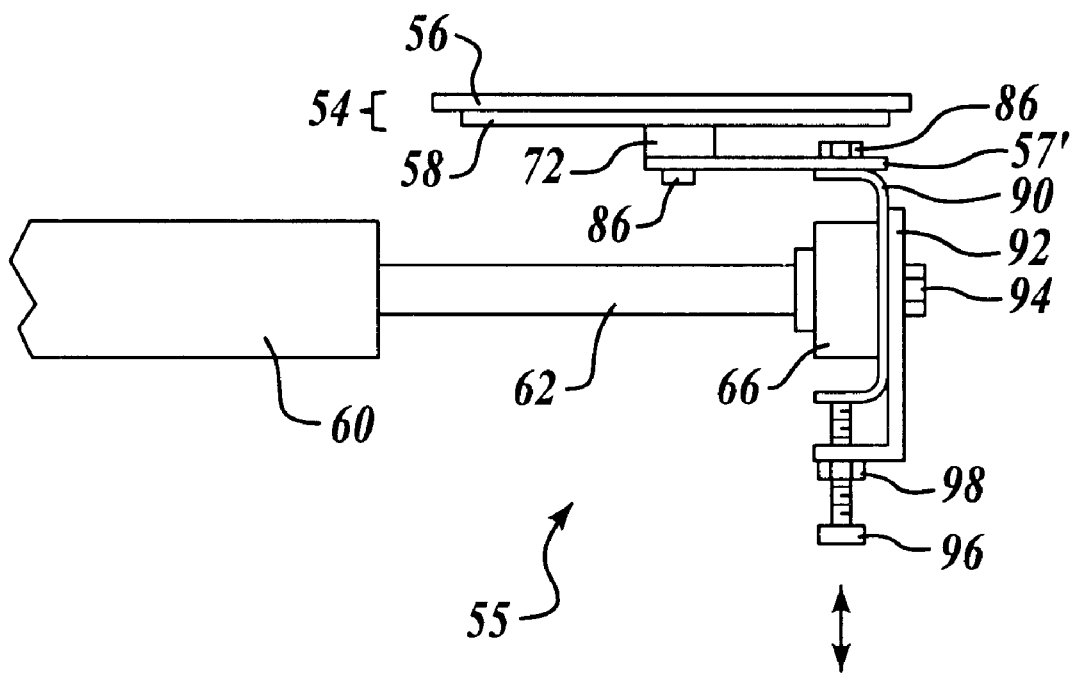
FIG. 7 is a partial cross-sectional view of a gate including a vertically adjustable spring arrangement, formed in accordance with the present invention.

In some applications, it may be desirable to adjust the vertical position of the cover plate 54 relative to the conveyor bed 26 after the carriage assembly 55 is mounted to the frame 14 of the conveying system 10. FIG. 7 illustrates an alternative spring arrangement in accordance with the present invention, suitable for effecting such vertical adjustment. In FIG. 7, the same components as described above are referred to by the same reference numbers. In this arrangement, the cover plate 54 including the bearing plate 56 and the support plate 58 is supported by a flat leaf spring 57'. As before, an elastic mount 72 is interposed between the cover plate 54 and one end of the leaf spring 57' and all components are secured by a bolt 86. The other end of the flat leaf spring 57' is secured to an adjustable bracket 90 with a bolt 86. The adjustable bracket 90 includes a vertically extending slot (not shown), and is generally sandwiched between a clamping plate 92 and the carriage block 66 of the carriage assembly 55. One or more clamp bolts 94 extend through the clamping plate 92 and the vertically extending slot of the adjustable bracket 90 into the carriage block 66. Therefore, the adjustable bracket 90 is vertically slidable along its slot relative to the clamping plate 92 and the carriage block 66. Further, one or more adjusting screws 96 are threaded through one or more nuts 98 and the clamping plate 92 against the adjusting bracket 90. Thus constructed, when the adjusting screw(s) 96 are rotated clockwise or counterclockwise, the adjustable bracket 90 supporting the flat leaf spring 57' and the cover plate 54 is vertically displaced relative to the carriage block 66 of the carriage assembly 55 that is mounted to the frame 14 of the conveying system 10. Therefore, even after the carriage assembly 55 is mounted onto the frame 14, a user may adjust the vertical position of the cover plate 54 relative to the conveying member 20 using this arrangement.

While the preferred embodiments of the invention have been illustrated and described, it will be appreciated that various changes can be made therein without departing from the spirit and scope of the invention.

The embodiments of the invention in which an exclusive property or privilege is claimed are defined as follows:

1. A gate for a conveyor, the conveyor comprising a conveyor bed having a surface portion defining an aperture, the gate comprising:

a cover plate placed adjacent to the aperture and configured to be moved between a first position covering a first portion of the aperture and a second position covering a second portion of the aperture;

a loading system coupled to the cover plate and exerting a force in the direction generally perpendicular to the surface portion of the conveyor bed for urging the cover plate into contact with the surface portion of the conveyor bed defining the aperture; and a carriage assembly coupled to the loading system for moving the cover plate between the first and second positions.

2. The gate of claim 1, wherein the carriage assembly generally prohibits movement of the cover plate in a direction normal to the surface portion of the conveyor bed defining the aperture but permits movement of the cover plate in a direction generally parallel to the surface portion.

3. The gate of claim 1, wherein the carriage assembly further comprises an adjustment arrangement for adjusting the force exerted by the loading system to urge the cover plate into contact with the surface portion of the conveyor bed.

4. The gate of claim 1, wherein the loading system comprises a first elastic element and a second elastic element that is arranged in series with the first elastic element.

5. The gate of claim 4, wherein the first elastic element comprises a spring plate and the second elastic element comprises an elastomer mount.

6. The gate of claim 1, wherein the conveyor comprises an excited frame that vibrates the conveyor bed.

7. The gate of claim 6, wherein the carriage assembly comprises a base element coupled to the excited frame of the conveyor and a movable element coupled to the loading system.

8. The gate of claim 7, wherein the base element comprises a mounting block having a portion defining a bore, and the movable element comprises a support rod coupled to the loading system, the support rod being slidably arranged in the bore to be moveable in a direction substantially parallel to the surface portion of the conveyor bed defining the aperture.

9. The gate of claim 8, wherein the movable element further comprises an actuator coupled to the support rod for sliding the support rod through the bore.

10. The gate of claim 9, wherein the actuator is selected from the group consisting of a pneumatic actuator, an electric actuator, and a hydraulic actuator.

11. The gate of claim 9, wherein the actuator comprises a linear actuator.

12. The gate of claim 11, wherein the linear actuator is of a double-acting type.

13. A gate for a vibratory conveyor, the conveyor comprising a frame and a conveyor bed having a surface portion defining an aperture, the gate comprising:

(a) a cover plate of sufficient dimension to substantially cover the aperture in a first position;

(b) a biasing system coupled to the cover plate and exerting a force in the direction generally perpendicular to the surface portion of the conveyor bed for urging the cover plate into contact with the surface portion of the conveyor bed defining the aperture; and (c) a carriage assembly coupled to the biasing system for moving the cover plate, the carriage assembly comprising an actuator for selectively moving the cover plate from the first position to a second position exposing at least a portion of the aperture.

14. The gate of claim 13, wherein the carriage assembly generally prohibits movement of the cover plate in a direction normal to the surface portion of the conveyor bed defining the aperture but permits movement of the cover plate in a direction parallel to the surface portion.

15. The gate of claim 13, wherein the carriage assembly further comprises:
  (i) a base element mounted to the frame of the conveyor; and
  (ii) a movable element coupled to the biasing system the movable element further being coupled to the actuator to be moved by the actuator.

16. The gate of claim 15, wherein the base element comprises a mounting block having a portion defining a bore, and the movable element comprises a support rod being slidably arranged in the bore to be moveable in a direction substantially parallel to the surface portion of the conveyor bed defining the aperture.

17. The gate of claim 13, wherein the biasing system comprises a first elastic element and a second elastic element that is arranged in series with the first elastic element.

18. The gate of claim 17, wherein the first elastic element comprises a spring plate and the second elastic element comprises an elastomer mount.

19. The gate of claim 13, wherein the actuator comprises a linear actuator.

20. The gate of claim 19, wherein the linear actuator comprises a double-action linear actuator.

21. The gate of claim 19, wherein the linear actuator is selected from the group consisting of a pneumatic actuator, an electric actuator, and a hydraulic actuator.

* * * * *

UNITED STATES PATENT AND TRADEMARK OFFICE
CERTIFICATE OF CORRECTION

PATENT NO. : 6,705,458 B2
DATED : March 16, 2004
INVENTOR(S) : B.K. Thompson et al.

It is certified that error appears in the above-identified patent and that said Letters Patent is hereby corrected as shown below:

Column 8,
Line 38, "moveable" should read -- movable --

Column 9,
Line 8, "biasing system" should read -- biasing system, --
Line 14, "moveable" should read -- movable --

Signed and Sealed this

Twenty-seventh Day of July, 2004

JON W. DUDAS
*Acting Director of the United States Patent and Trademark Office*